May 14, 1968 C. J. KORZINEK 3,382,648
FILM FEEDING DEVICE

Filed Sept. 7, 1965 2 Sheets-Sheet 1

C. J. KORZINEK
INVENTOR.

BY *Ernest J. Peterson*

AGENT

May 14, 1968 C. J. KORZINEK 3,382,648
FILM FEEDING DEVICE

Filed Sept. 7, 1965 2 Sheets-Sheet 2

C. J. KORZINEK
INVENTOR.

BY *Ernest J. Peterson*

AGENT 3,382,648
FILM FEEDING DEVICE
Charles J. Korzinek, Wilmington, Del., assignor to Hercules Incorporated, a corporation of Delaware
Filed Sept. 7, 1965, Ser. No. 485,496
1 Claim. (Cl. 53—228)

ABSTRACT OF THE DISCLOSURE

An overwrap film feed machine is modified by the installation of a suction device below the line of travel of the articles to be wrapped to provide a force to draw the wrapping film into the path of the articles. The free end of the film is drawn into the suction device and when the film is contacted by the article, an article advancing lug contacts a valve which breaks the vacuum allowing the film to be withdrawn from the suction device.

---

Figure 1:
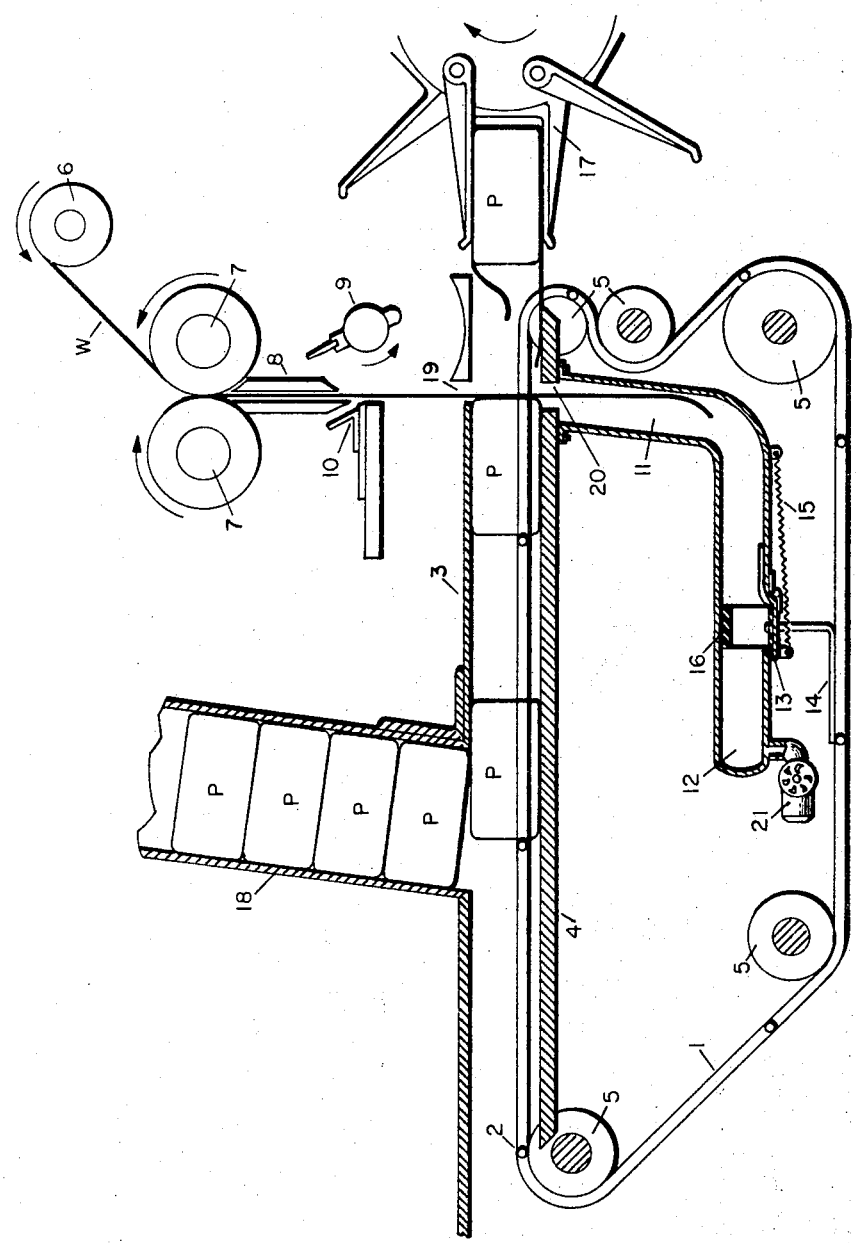

This invention relates to improvements in apparatus for applying a thin, flexible overwrap to a regularly shaped object.

In packing commodities such as cigarettes, decks of cards, certain types of candy and the like, it is customary to enclose the article within a lightweight, substantially form retentive package, and thereafter to apply an overwrapping of a flexible, transparent film to the package. This film serves as a barrier to protect the contents of the package from air, dirt, and moisture and also prevents the contents from being tampered with before the package comes into the hands of the ultimate consumer.

In past years, large quantities of regenerated cellulose film (cellophane) have been used in the overwrap application. This film is relatively inexpensive, easy to print and decorate, and heat seals readily, thereby forming a secure package. The physical properties of cellophane are such that it is relatively easy to handle in automatic wrapping equipment.

More recently, however, new types of synthetic films have been introduced which likewise are attractive candidates for the type of application discussed above. The films of the olefin polymers, for example, such as polyethylene and polypropylene have properties which make them superior in many respects to cellophane. In particular, these films have substantially better moisture transmission resistance and can thus retain cigarettes, candy, or such products in a fresher state than does cellophane. However, since cellophane has been in use in this application for some years, the majority of the packaging equipment currently available has been designed specifically for use with cellophane. Accordingly, problems have been encountered when attempts have been made to employ these machines with other synthetic films.

In conventional overwrap packaging machines, the packages to be wrapped are fed according to a predetermined schedule, into the wrapping apparatus by means of a continuous feed mechanism, such as, e.g., a series of spaced apart, chain driven conveyor lugs. Simultaneously, the wrapping film is also fed from a supply source, past a film cutting means, along a path substantially perpendicular to the line of travel of the aforesaid packages, and intersects the line of travel of the packages at a point prior to the point of discharge of the packages from the conveyor into the wrapping apparatus, passing between a pair of conveyor lugs to a point below the said line of travel. By proper synchronization of the apparatus, the leading edge of the packages contacts the film just as the proper length of film is below the contact point. The package feed means continues to advance the package, and now the film, while the film feed means continues to feed out film until the proper length of film is above the package-film contact point, whereupon the film is severed by means provided therefor.

In the portion of the wrapping film's path beyond the film feed rolls, no mechanical motivating force can be applied to the film as it must be free to be carried away by the oncoming packages as soon as it is severed from the web. Thus, throughout the distance from the feed rolls down into the narrow gap, the film hangs free and is pushed ahead by the feed rolls. With cellophane, this free fall causes no great problem, inasmuch as cellophane is a relatively stiff material which can be pushed ahead fairly easily.

However, serious problems are encountered in advancing a wrapper of a polyolefin film through the free fall area of the described apparatus. Normally, the polyolefin films employed in the overwrap application are thin as compared to cellophane films. Accordingly, they are not so stiff as cellophane films and not readily pushed ahead in a controlled path into and through the free fall area. These films also exhibit a much greater static build-up propensity because of which they tend to be attracted to the various members of the machine with which they come into contact or proximity. For these reasons, it has been found virtually impossible to feed lightweight polyolefin films to such machines.

Now, in accordance with this invention, apparatus is provided which alleviates the difficulties set forth above and facilitates the feeding of a limp film into an overwrap packaging machine. The improved apparatus comprises a film feeding apparatus for an overwrap packaging machine, said apparatus being equipped with a suction chamber disposed to draw the film downward in a straight line in the free fall zone of the film's travel.

Figure 2:
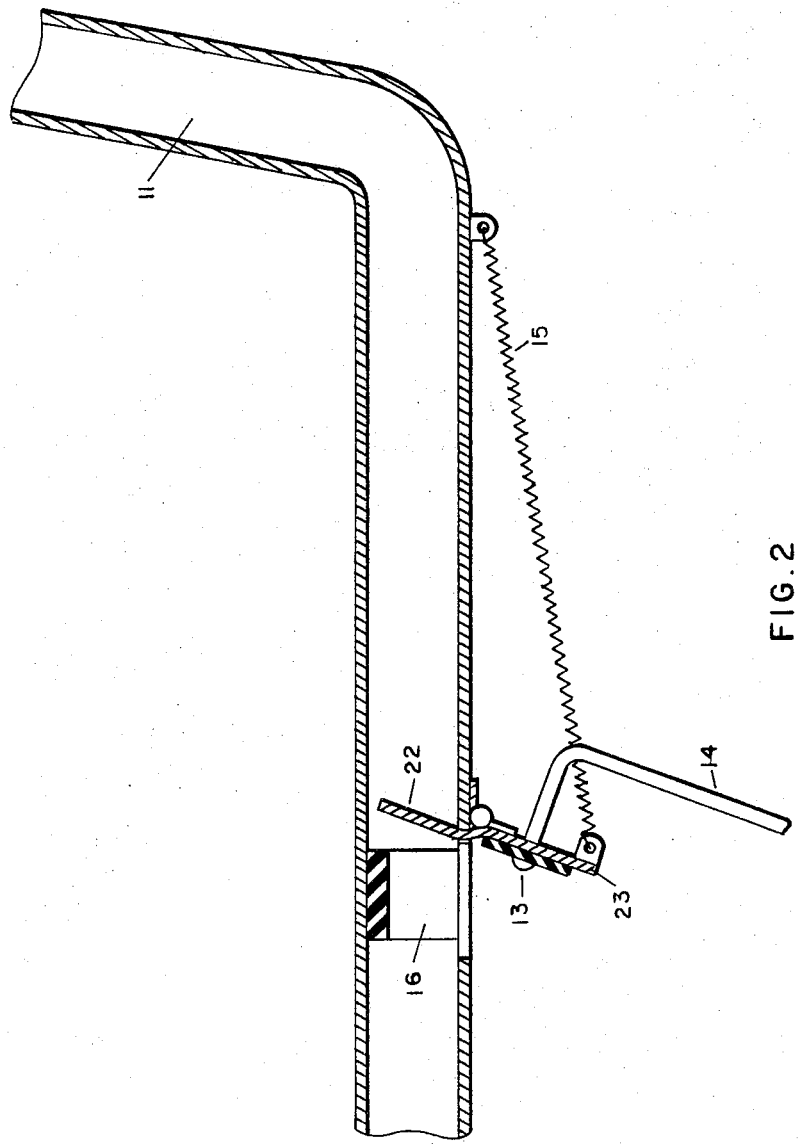

The invention is more fully disclosed in the attached drawings in which:

FIG. 1 is a section view of the film feeding apparatus according to the instant invention; and FIG. 2 is a detail section view of one form of suction chamber suitable for use in the apparatus of the invention.

Referring now to both figures of the drawing, reference numeral 1 represents a pair of spaced apart, coacting conveyor chains having a plurality of package advancing lugs 2, each secured on either end to one of the chains. Numerals 3 and 4 represent upper and lower package support rails respectively, having film accommodating gaps 19 and 20, and 5 represents a plurality of conveyor chain drive sprockets. Numeral 7 represents a pair of film feed rollers, 8 is a film guide in the form of corrugating fingers which give the film a temporary stiffness above the knife section, 9 a rotary cutting knife, and 10 a stationary knife blade. Numeral 11 indicates generally a film suction chamber mounted on lower package support rail 4, 12 is a nozzle for connecting the chamber to a vacuum source 21, 13 is a vacuum breaking flapper valve having an interior gate 22 and an exterior gate 23, 14 an actuating arm for same, 15 a spring, and 16 a rubber valve seat. Numeral 17 indicates generally a rotatable banded package gripping means of conventional design, and 18 is an unwrapped package feed hopper. All elements of the apparatus are, of course, conventional except for film suction chamber 11 and its associated elements and the conventional elements shown are intended to be illustrative, not limiting.

In operation of the apparatus, the packages to be wrapped, P, are loaded into the feed hopper 18, from which they fall by gravity onto lower package support rail 4 and are engaged by package advancing lugs 2, drawn along by conveyor chains 1, lightly contacting both upper and lower package support rails 3 and 4. Simultaneously, wrapping film W, supplied from roll 6, is fed by feed rollers 7, between film feed guides 8 and downward through the gap between rotating knife 9 and stationary blade 10, between conveyor chains 1 and into film accommodating gaps 19 and 20 in package support rails 3 and 4. The film, fed in this manner, is now perpendicular to the path of travel of the thus far unwrapped packages. When the length of film required to wrap three sides of the package has been fed out, package P contacts the film, pushing the same ahead of it. As the package pushes the film beyond the narrow film accommodating gaps 19 and 20 and again becomes enclosed between upper and lower package support bars 3 and 4, the film is caused to fold about three sides of the package to form a U-shaped band.

Up to this point, the operation of the apparatus as described is identical to the operation of the same equipment employing cellophane film. However, as stated, when the film employed is a lightweight, thin material such as a polyolefin, the film cannot be force fed along the prescribed path downward from the feed rolls 7 and through the openings 19 and 20. For example, the high static susceptibility of these films causes them to be attracted to the other metal members of the apparatus. In addition, the film is so light in weight and flexible that small air currents can easily blow it out of position.

In order to assure that the film will follow the desired path from feed rolls 7, through openings 19 and 20, suction chamber 11 is attached to a vacuum source and a vacuum drawn thereon through nozzle 12. This vacuum creates a flow of air which influences the path of the film by drawing the leading edge thereof toward and into chamber 11 as the film is fed downward by feed rolls 7. It is thus assured that the film is advanced to the correct location simultaneously with the advancing package. The vacuum source can be any means capable of drawing a vacuum, such as, e.g., a rotary pump, a steam jet, or a centrifugal air pump. The amount of vacuum is not critical; in general, a vacuum sufficient to create an air flow of about 82 cubic feet per minute per square feet of cross-sectional area of the vacuum chamber is sufficient. As the advancing package contacts the film, the vacuum is broken to allow the film to be readily drawn out of the suction chamber as it is pushed forward by the package.

One means, though not the only means, of controlling the vacuum is by opening and closing flapper valve 13, actuated by the film advancing lugs 2. After the package has been advanced to the terminus of package support rails 3 and 4 and thence into the package gripping apparatus 17, conveyor chains 1 continue around the series of drive sprockets 5 and along their circular path. As the chains continue about their path, package advancing lugs 2 contact flapper valve actuating arm 14, closing the valve and holding the same shut, as shown in FIG. 1, during the time required for the lug to travel the length of the elongated flat section of the said arm. The apparatus is so synchronized that, at the instant that the advancing package contacts the film, the lug loses contact with the valve actuating arm, whereupon spring 15 causes the flapper to spring back to its open position and come to rest with the interior gate 22 within the chamber resting against and in sealing relationship with valve seat 16. Thus, the vacuum is broken momentarily, allowing the film to be drawn out of the suction chamber. Within a very short time interval, however, the next succeeding package advancing lug contacts arm 14, the valve is closed, and the vacuum is reformed.

It is not intended that the flapper valve arrangement just described should be the only useful means of making and breaking the vacuum, though this is a very practical and preferred means. Any other means known to the art can likewise be employed.

While the problems sought to be solved by the apparatus of this invention are particularly troublesome with polyolefin films, the advantages gained therewith are also gained when the invention is used with other lightweight, highly flexible synthetic polymer films. For example, the apparatus can also be used with films of polyester, polyvinyl chloride, and even with cellophane.

What I claim and desire to protect by Letters Patent is:

1. In apparatus for feeding film to an overwrap packaging machine having means for advancing an unwrapped package along a fixed path, means for supplying a continuous web of wrapping film in a path perpendicular to said fixed path, whereby the unwrapped package contacts the continuous web as it advances along said fixed path, means for periodically severing a predetermined length of film from the aforesaid continuous web, and means for folding the severed film into a U-shaped band about the package, the combination therewith which comprises
   (a) a suction chamber disposed below the unwrapped package advancing means and in the path of the continuous web of wrapping film;
   (b) means associated with said chamber for creating a flow of air into said chamber sufficient to draw the film thereinto; and
   (c) a flapper valve adapted alternately to seal and expose an opening in the suction chamber, thereby periodically interrupt said flow of air, said flapper valve being actuated by periodic contact with the unwrapped package advancing means.

References Cited

UNITED STATES PATENTS

| | | | |
|---|---|---|---|
| 3,277,630 | 10/1966 | Youngman et al. | 53—389 |
| 3,274,870 | 9/1966 | Schmermund | 53—389 X |
| 3,307,327 | 3/1967 | Liedtke | 53—389 X |

WILLIAM W. DYER, JR., *Primary Examiner.*

N. ABRAMS, *Assistant Examiner.*